US007766299B2

(12) United States Patent
Titus, II et al.

(10) Patent No.: US 7,766,299 B2
(45) Date of Patent: Aug. 3, 2010

(54) SUPPORT POST FOR A FLEXIBLE SUBSTRATE

(76) Inventors: Jack S. Titus, II, 2459 Candlewick La., Marcellus, NY (US) 13108; Shannon Ahern, 3420 Clinton Rd., Jordon, NY (US) 13080

( * ) Notice: Subject to any disclaimer, the term of this patent is extended or adjusted under 35 U.S.C. 154(b) by 14 days.

(21) Appl. No.: 11/606,594

(22) Filed: Nov. 30, 2006

(65) Prior Publication Data

US 2007/0187568 A1 Aug. 16, 2007

(30) Foreign Application Priority Data

Feb. 10, 2006 (CA) .................................. 2537417

(51) Int. Cl.
*F16M 13/00* (2006.01)

(52) U.S. Cl. ......................... 248/577; 248/623; 52/157

(58) Field of Classification Search ................. 248/576, 248/577, 622, 623; 52/295, 296, 157
See application file for complete search history.

(56) References Cited

U.S. PATENT DOCUMENTS

| | | | | |
|---|---|---|---|---|
| 2,246,323 | A * | 6/1941 | Schaclchlin | 248/623 |
| 2,626,023 | A * | 1/1953 | Lear | 411/60.1 |
| 2,689,987 | A * | 9/1954 | Berger | 52/293.3 |
| 3,188,041 | A * | 6/1965 | Town | 248/351 |
| 3,517,470 | A * | 6/1970 | Luebkeman | 52/157 |
| 3,579,938 | A | 5/1971 | Andersson | |
| 3,676,965 | A | 7/1972 | Deike | |
| 3,837,752 | A | 9/1974 | Shewchuk | |
| 4,603,520 | A | 8/1986 | Deike | |
| 5,409,192 | A * | 4/1995 | Oliver | 248/577 |
| 5,819,487 | A | 10/1998 | Bull et al. | |
| 6,334,281 | B1 * | 1/2002 | Oliver et al. | 52/157 |
| 7,004,683 | B1 * | 2/2006 | Rupiper | 405/229 |
| 2004/0221543 | A1 * | 11/2004 | Eleas et al. | 52/736.1 |
| 2006/0131551 | A1 | 6/2006 | Hopp et al. | |

* cited by examiner

*Primary Examiner*—J. Allen Shriver, II
*Assistant Examiner*—Bradley H Duckworth
(74) *Attorney, Agent, or Firm*—Davis & Bujold, P.L.L.C.

(57) ABSTRACT

A support post for a flexible substrate includes a primary base and a secondary base adapted to rest upon the primary base. The secondary base supports an upright substrate support member. The secondary base is selectively secured to the primary base to orient the upright substrate support at such angle as may be required to maintain the flexible substrate in a taut condition.

17 Claims, 3 Drawing Sheets

SUPPORT POST FOR A FLEXIBLE SUBSTRATE

This application claims priority from Canadian Application Serial No. 2,537,417 filed Feb. 10, 2006.

FIELD OF THE INVENTION

The present invention relates to a support post used to support one end of a flexible substrate.

BACKGROUND OF THE INVENTION

PCT Publication No. WO2004097119 (Hopp 2004) discloses a flexible substrate that can be used as a barrier or an advertising banner. The flexible substrate is held taut between support posts. Problems have been experienced with the flexible substrate drooping in the middle, so that it is not aesthetically appealing.

SUMMARY OF THE INVENTION

According to the present invention there is provided a support post for a flexible substrate, which includes a primary base and a secondary base adapted to rest upon the primary base. The secondary base supports an upright substrate support member. Means are provided for connecting the secondary base to the primary base to orient the upright substrate support member at a selected angle.

With the support post, as described above, the upright substrate support member can be oriented at such angle as may be required to maintain the flexible substrate in a taut condition.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 2:
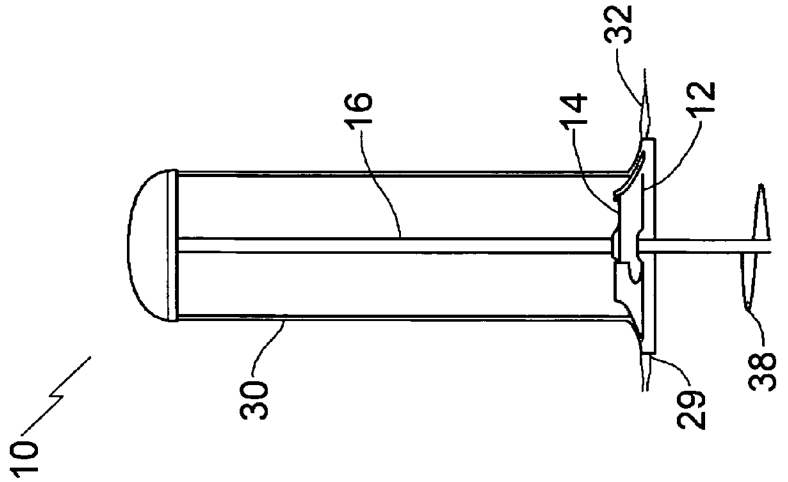
FIG. 2 is a side elevation view of a support post for a flexible substrate constructed in accordance with the teachings of the present invention, with the primary base having a depending screw auger member.

The preferred embodiment, a support post for a flexible substrate generally identified by reference numeral 10, will now be described with reference to FIG. 1 through 5.

Figure 1:
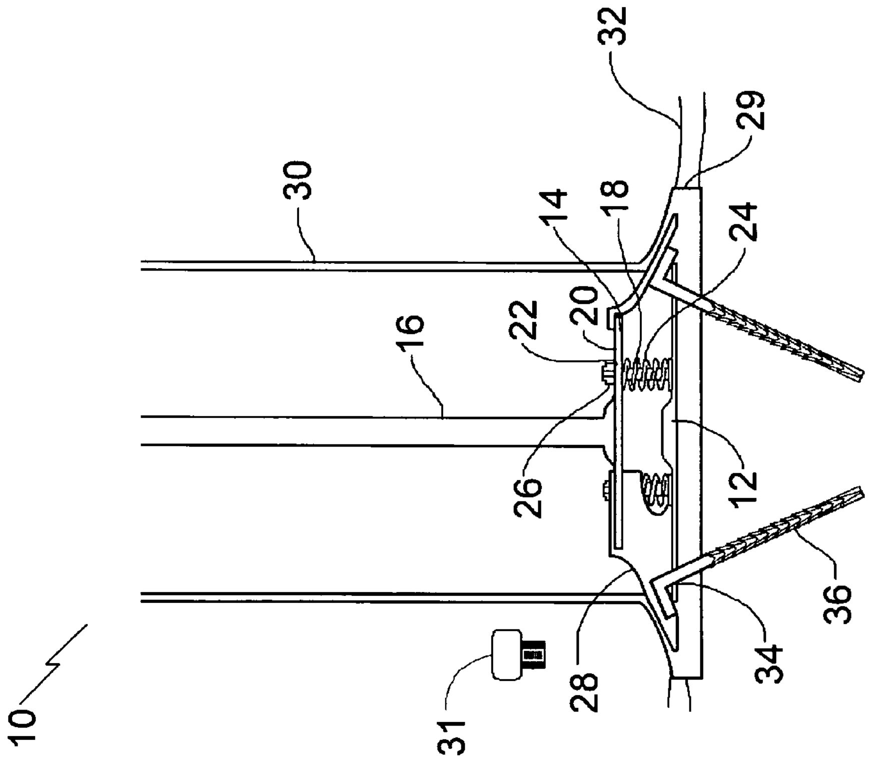
FIG. 1 is a detailed side elevation view of a support post for a flexible substrate constructed in accordance with the teachings of the present invention, with the primary base secured to a ground surface with ground anchors.
Figure 4:
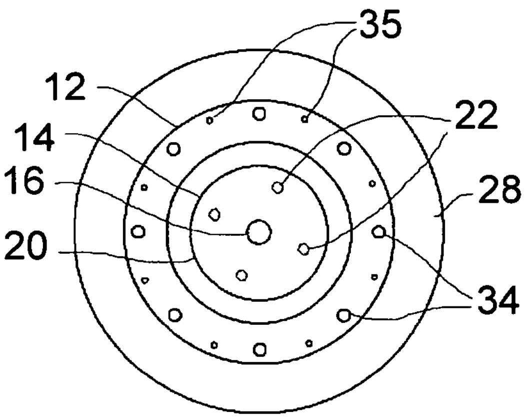
FIG. 4 is a top plan view, of the primary and secondary bases.
Figure 5:
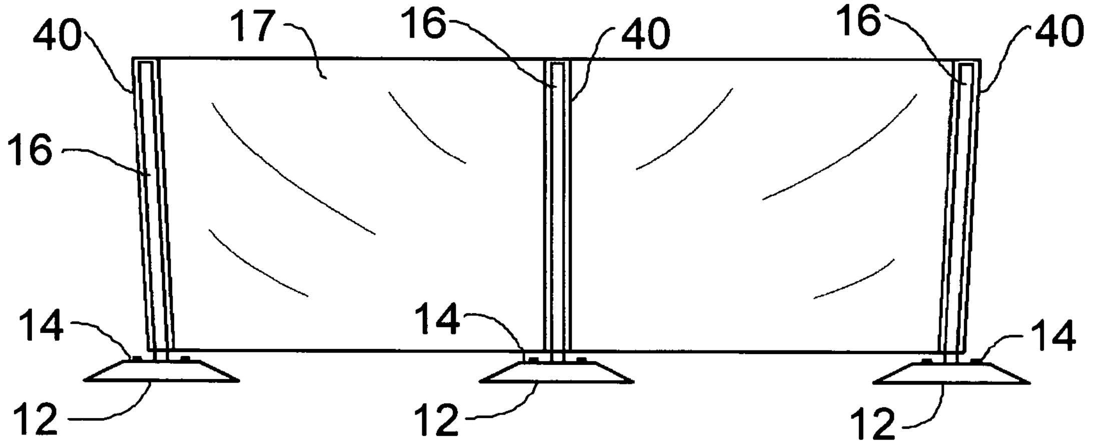
FIG. 5 is a side elevation of the support post illustrated in FIG. 1 in use supporting a flexible substrate.

Structure and Relationship of Parts:

Referring now to FIG. 1, support post 10 includes a primary base 12 and a secondary base 14 adapted to rest upon primary base 12. Secondary base 14 is used to support an upright substrate support member 16. Referring to FIG. 5, upright substrate support member 16 is used to support a flexible substrate 17. There is also provided means to connect secondary base 14 to primary base 12 to orient upright substrate support member 16 at a selected angle. As depicted, the means to connect secondary base 14 to primary base 12 includes at least three, but preferably four, upright connective members 18 projecting upwardly from primary base 12. Three allows an adjustment of any angle to be made, while using four may make the adjusting the angle somewhat easier. Upright connective members 18 are preferably bolts. Referring to FIG. 4, secondary base 14 has a base plate 20 with a receiving aperture 22 for each upright connective member 18 of primary base 14. Referring to FIG. 1, a spring 24 is positioned over each upright connective member 18 and sandwiched between primary base 12 and secondary base 14. Finally, means, such as nuts 26 threaded onto upright connective member (bolts) 18, are used to selectively exert a clamping force upon base plate 20 via upright connective members 18 to orient upright substrate support member 16 at a selected angle. If upright substrate support member 16 had different threads than secondary base 14, adapter 31 can be attached to secondary base 14 to allow for different thread options. As the preferred embodiment uses a bastard thread, this allows for more flexibility of use.

Base plate 20 of secondary base 14 has a flexible depending skirt 28 that allows the space between primary base 12 and secondary base 14 to remain covered, when adjustments are made to the angle of substrate support member 16. Flexible skirt 28 has a downward facing grip 29 for stability. In addition, referring to FIG. 2, a cylindrical housing 30 is provided to cover upright substrate support member 16 when not in use. If desired, housing 30 may carry a logo, message or advertisement.

Figure 3:
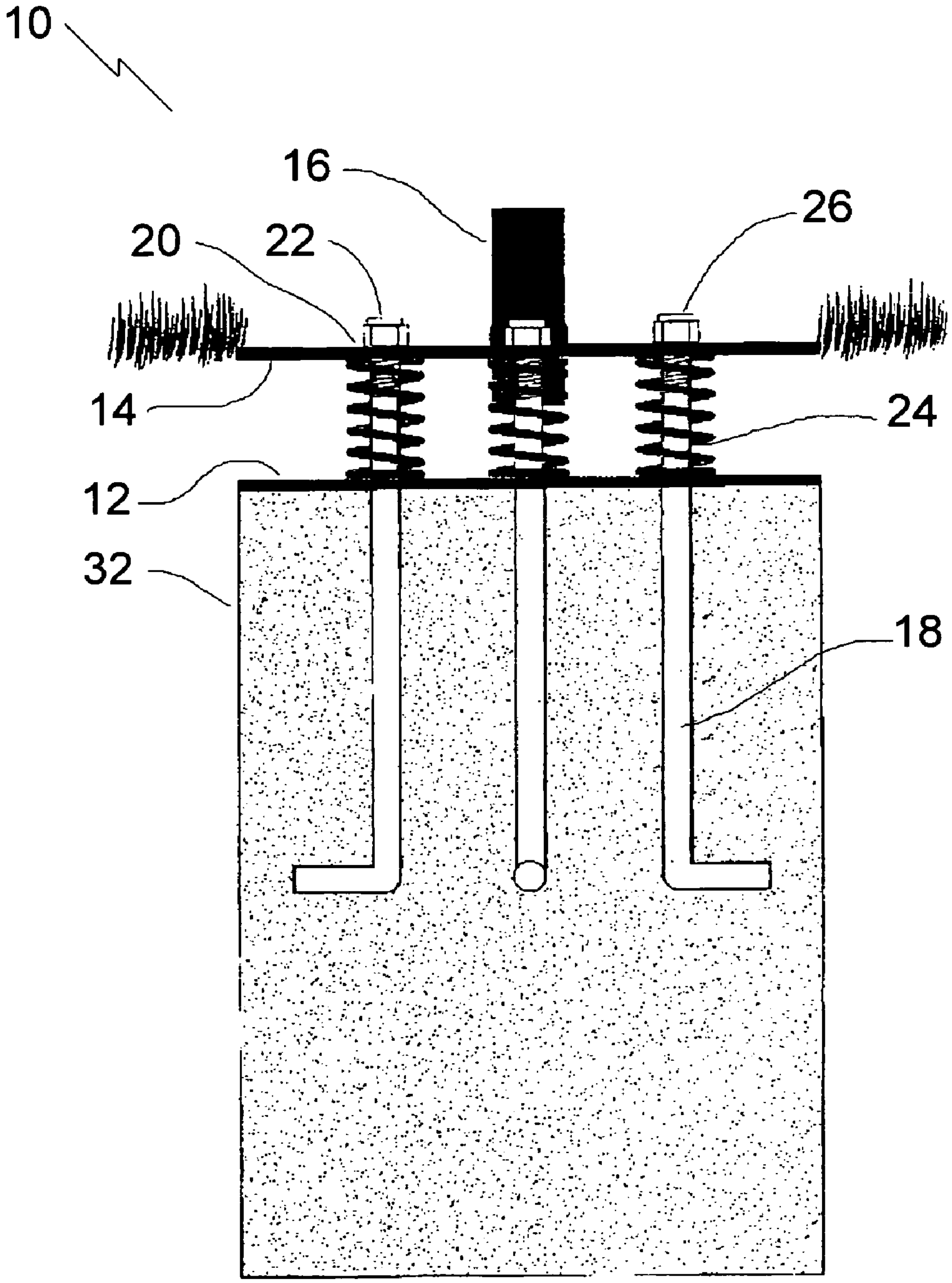
FIG. 3 is a detailed side elevation view of a support post for a flexible substrate constructed in accordance with the teachings of the present invention, with the primary base having bolts that serve as concrete anchors.

There may be different requirements for the method of attaching support post 10 to the base 32, depending on its composition. For example, referring to FIG. 1, if base 32 is primarily dirt or the like, primary base 12 may have apertures 34 adapted to receive ground anchors 36. Primary base 12 is shown in FIG. 4 to have apertures 34 and apertures 35 to receive concrete tapping screws, if needed, (not shown) evenly spaced about its circumference. Referring to FIG. 1, ground anchors 36 are shown to be barbed and installed at an angle to provide a better hold. Referring to FIG. 3, if base 32 is made from concrete, bolts 18 may be adapted to serve as concrete anchors, where bolts 18 are permanently installed in the concrete. In this case, bolts 18 pass through both primary base 12 and secondary base 14. As well, it can be seen that using concrete for base 32 allows secondary base 14 to be installed flush with the ground level. Finally, referring to FIG. 2, if the ground is sand or loose dirt or the like, primary base 12 may have has a depending ground anchor such as a depending screw auger member 38. As depicted, auger member 38 has only one auger flight, as it has been found that more flights can increase the instability of the ground.

Operation:

The use of support post 10 will now be discussed. Support post 10 is provided as described above with reference to FIG. 1 through 4. primary base 12 is installed on base 32, using the appropriate attachment means depicted in FIG. 1 through 3. Referring now to FIG. 5, flexible substrate 17 is installed on support member 16 by inserting support member 16 into pockets 40 of flexible substrate 17 such that a barrier is created. Referring to FIG. 1, selected nuts 26 connected to bolts 18 are tightened, and others may be loosened if required, such that a clamping force is applied to base plate 20. This allows the user to adjust the angle of upright substrate support member 16, in order to remove any slack from the portion of flexible substrate 17 between support members 16. Referring to FIG. 2, when not in use, a cylindrical housing 30, or other shape, may be used to cover support member 16.

Variations:

In this patent document, the word “comprising” is used in its non-limiting sense to mean that items following the word are included, but items not specifically mentioned are not excluded. A reference to an element by the indefinite article “a” does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

What is claimed is:

1. A support for a flexible substrate, comprising:

a first upright support member;

a flexible substrate having a first end and a second end, the first end being supported by the first upright support member;

a primary base;

a secondary base adapted to rest upon the primary base, the secondary base supporting the first upright support member; and an assembly for connecting the secondary base to the primary base to orient the first upright support member at a selected angle, comprising:

at least three upright bolts projecting upwardly from the primary base;

the secondary base having a base plate with a receiving aperture for each of the bolts of the primary base;

a spring being positioned over each of the bolt and sandwiched between the primary base and the secondary base, such that the base plate floats on and is supported by each spring; and nuts threaded onto each of the bolts for selectively exerting a clamping force upon the base plate against each spring via the at least three bolts to orient a second upright support member at a selected angle in order to tension the flexible substrate, the clamping force being applied by the nut on one side of the base plate and the spring on the other side of the base plate.

2. A combination of a first support, a second support and a flexible substrate, wherein:

the first support comprises:

a first support member having a longitudinal axis;

a primary base;

a secondary base adapted to be supported by the primary base, the secondary base supporting the first support member at one end of the longitudinal axis;

an assembly for connecting the secondary base to the primary base to orient the first support member at a selected angle comprising:

at least three springs arranged between the primary base and the secondary base in positions radially and circumferentially about the longitudinal axis of the first support member so that the secondary base floats on and is supported by each spring;

the flexible substrate having a first end and a second end, and the first end being supported in a desired orientation by the first support member;

the second support comprising a second support member supporting the second end of the flexible substrate in a desired orientation.

3. The combination as defined in claim 2, wherein the assembly for connecting the secondary base to the primary base comprises:

at least three connective members projecting from the primary base;

the secondary base having a base plate with a receiving aperture for each of the connective members of the primary base;

one of the springs being positioned over each of the connective members and sandwiched between the primary base and the secondary base; and means to selectively exert a selective compressive force upon each spring via adjusting the length of the corresponding connective member to orient the first support member at a selected angle.

4. The combination as defined in claim 3, wherein the at least three upright connective members are bolts.

5. The combination as defined in claim 4, wherein the means to selectively exert a compressive force are nuts which are threaded onto each of the bolts.

6. The combination as defined in claim 3, wherein there are four upright connective members.

7. The combination as defined in claim 3, wherein the base plate of the secondary base has a flexible depending skirt.

8. The combination as defined in claim 2, wherein a housing is provided to cover the first support member when not in use.

9. The combination as defined claim 8, wherein the housing is cylindrical.

10. The combination as defined in claim 8, wherein the housing carries one of a logo, a message or an advertisement.

11. The combination as defined in claim 2, wherein the primary base has apertures adapted for receiving ground anchors.

12. The combination as defined in claim 4, wherein the bolts are adapted to serve a concrete anchors.

13. The combination as defined in claim 2, wherein the primary base has at least one depending ground anchor.

14. The combination as defined in claim 13, wherein the ground anchor is a single depending screw auger member.

15. The combination as defined in claim 2, wherein the assembly acts to keep the flexible substrate taut.

16. The combination as defined in claim 2, wherein the assembly acts to compensate for irregular terrain.

17. A support for a flexible substrate comprising:

a first upright support member;

a first primary base;

a first secondary base adapted to rest upon the first primary base, the first secondary base supporting the first upright support;

a first assembly for connecting the first secondary base to the first primary base to orient the first upright support member at a selected angle, the first assembly comprising:

at least three upright bolts projecting upwardly from the first primary base;

the first secondary base having a first base plate with a receiving aperture for each of the bolts of the first primary base;

a spring being positioned over each of the bolt and sandwiched between the first primary base and the first secondary base, such that the first base plate floats on and is supported by each spring; and nuts threaded onto each of the bolts for selectively exerting a clamping force upon the first base plate against each spring via the at least three bolts to orient the first upright support member at a selected angle in order to tension a flexible substrate, with the clamping force being applied by the nut on one side of the base plate and the spring on the other side of the base plate;

a second primary base;

a second secondary base adapted to rest upon the second primary base, the second secondary base supporting the second upright support;

a second assembly for connecting the second secondary base to the second primary base to orient the second upright support member at a selected angle, the second assembly comprising:

at least three upright bolts projecting upwardly from the second primary base;

the second secondary base having a second base plate with a receiving aperture for each of the bolts of the second primary base;

a spring being positioned over each of the bolt and sandwiched between the second primary base and the second secondary base, such that the second base plate floats on and is supported by each spring; and nuts threaded onto each of the bolts for selectively exerting a clamping force upon the second base plate against each spring via the at least three bolts to orient the second upright support member at a selected angle in order to tension a flexible substrate, with the clamping force being applied by the nut on one side of the base plate and the spring on the other side of the base plate;

the flexible substrate having a first end supported by the first upright support member and a second end supported by the second upright support member.

* * * * *